(12) United States Patent
Rolion et al.

(10) Patent No.: US 10,635,203 B2
(45) Date of Patent: Apr. 28, 2020

(54) WRITING INSTRUMENT WITH RETRACTABLE TIP COMPRISING A PAD FOR CAPACITIVE SCREEN

(71) Applicant: SOCIETE BIC, Clichy (FR)

(72) Inventors: Franck Rolion, Asnieres sur Oise (FR); Arnaud Bez, Garches (FR)

(73) Assignee: SOCIETE BIC, Clichy (FR)

( * ) Notice: Subject to any disclaimer, the term of this patent is extended or adjusted under 35 U.S.C. 154(b) by 0 days.

(21) Appl. No.: 15/771,451

(22) PCT Filed: Oct. 26, 2016

(86) PCT No.: PCT/FR2016/052781
§ 371 (c)(1),
(2) Date: Apr. 27, 2018

(87) PCT Pub. No.: WO2017/072445
PCT Pub. Date: May 4, 2017

(65) Prior Publication Data
US 2018/0307329 A1    Oct. 25, 2018

(30) Foreign Application Priority Data
Oct. 27, 2015    (FR) .................................... 15 60232

(51) Int. Cl.
*G06F 3/039*    (2013.01)
*B43K 8/00*    (2006.01)
(Continued)

(52) U.S. Cl.
CPC ............. *G06F 3/039* (2013.01); *B43K 5/005* (2013.01); *B43K 7/005* (2013.01); *B43K 8/003* (2013.01);
(Continued)

(58) Field of Classification Search
CPC ..................................................... G06F 3/039
See application file for complete search history.

(56) References Cited

U.S. PATENT DOCUMENTS 6,454,482 B1 *    9/2002    Silverbrook ......... B41J 2/17503
                                                          346/140.1
7,066,673 B1    6/2006    Kuo
(Continued)

FOREIGN PATENT DOCUMENTS

CN    2754896    2/2006
CN    200988363    12/2007
(Continued)

OTHER PUBLICATIONS

International Search Report dated Jan. 30, 2017 from corresponding International PCT Application No. PCT/FR2016/052781, 5 pages.
(Continued)

*Primary Examiner* — J C Jacyna
(74) *Attorney, Agent, or Firm* — Ohlandt, Greeley, Ruggiero & Perle, L.L.P.

(57) ABSTRACT

A writing instrument includes a first barrel and a second barrel that are able to rotate relative to each other about the axial direction, and presenting a first distal end and a second distal end, a writing tip being arranged at the first distal end while a pad for a capacitive screen is arranged at the second distal end, the writing tip and/or the pad for a capacitive screen being retractable by causing the first barrel to rotate relative to the second barrel, and where a barrel among the first barrel and the second barrel includes a tongue extending in the circumferential direction, the tongue being configured to establish electrical contact with the other barrel among the first barrel and the second barrel.

12 Claims, 3 Drawing Sheets

(51) Int. Cl.
*B43K 19/14* (2006.01)
*B43K 21/00* (2006.01)
*B43K 24/08* (2006.01)
*B43K 29/08* (2006.01)
*B43K 7/00* (2006.01)
*B43K 5/00* (2006.01)

(52) U.S. Cl.
CPC ............ *B43K 19/14* (2013.01); *B43K 21/006* (2013.01); *B43K 24/084* (2013.01); *B43K 29/08* (2013.01)

(56) References Cited

U.S. PATENT DOCUMENTS

| | | | |
|---|---|---|---|
| 8,576,203 | B2 | 11/2013 | Nakata et al. |
| 9,195,351 | B1 | 11/2015 | Rosenberg |
| 9,539,848 | B2 * | 1/2017 | Bez .................. B43K 7/12 |
| 2004/0154172 | A1 | 8/2004 | Tatz |
| 2005/0212780 | A1 | 9/2005 | Tokkonen |
| 2005/0279231 | A1 | 12/2005 | Lee |
| 2011/0094804 | A1 | 4/2011 | Liang |
| 2011/0304577 | A1 | 12/2011 | Brown et al. |
| 2011/0316815 | A1 | 12/2011 | Fang |
| 2012/0039662 | A1 | 2/2012 | Zhang et al. |
| 2012/0086664 | A1 * | 4/2012 | Leto .................. B43K 7/005 345/174 |
| 2012/0154340 | A1 | 6/2012 | Vuppu et al. |
| 2012/0194484 | A1 | 8/2012 | Lehman |
| 2012/0262429 | A1 | 10/2012 | Hsu et al. |
| 2012/0315074 | A1 * | 12/2012 | Roberts .................. B43K 24/14 401/32 |
| 2013/0194242 | A1 | 8/2013 | Park et al. |
| 2013/0322952 | A1 | 12/2013 | Zhang et al. |
| 2014/0028636 | A1 | 1/2014 | Zhang |
| 2014/0125606 | A1 | 5/2014 | Namkung |
| 2014/0270894 | A1 | 9/2014 | Wu et al. |
| 2015/0116287 | A1 * | 4/2015 | Yeh .................. B43K 8/003 345/179 |
| 2016/0011699 | A1 | 1/2016 | Harrison et al. |
| 2016/0216786 | A1 | 7/2016 | Rolion |
| 2017/0329422 | A1 | 11/2017 | Malinvern et al. |

FOREIGN PATENT DOCUMENTS

| | | |
|---|---|---|
| CN | 201304798 | 9/2009 |
| CN | 201773366 | 3/2011 |
| CN | 201970658 | 9/2011 |
| CN | 202177872 | 3/2012 |
| CN | 102902380 | 1/2013 |
| CN | 202711186 | 1/2013 |
| CN | 202838204 | 3/2013 |
| GB | 2496381 | 5/2013 |
| JP | 63-282516 | 11/1988 |
| JP | 3171232 | 10/2011 |
| JP | 2012-128486 | 7/2012 |
| JP | 2012-226554 | 11/2012 |
| KR | 10-2010-0125631 | 12/2010 |
| WO | 2011008533 A2 | 1/2011 |
| WO | 2012/094633 | 7/2012 |
| WO | 2012103323 | 8/2012 |

OTHER PUBLICATIONS

First Chinese Office Action dated Jul. 17, 2016 in related patent application No. CN201580062563.6, 13 pages.
Second Chinese Office Action dated Dec. 5, 2018 in corresponding Chinese Patent Application No. 2014800310025, 11 pages.
International Search Report dated Feb. 10, 2016 from corresponding International Patent Application PCT/FR2015/053111, 5 pages.
Chinese Office Action dated Dec. 25, 2017 from corresponding Chinese Patent Application 2014800310025, 11 pages.
Japanese Office Action dated Jan. 25, 2018 from corresponding Japanese Patent Application 2016-516224, 6 pages.
International Search Report dated Aug. 13, 2014 from corresponding PCT/FR2014/051255, 7 pages.

* cited by examiner

WRITING INSTRUMENT WITH RETRACTABLE TIP COMPRISING A PAD FOR CAPACITIVE SCREEN

TECHNICAL FIELD

The invention relates to a writing instrument including a pad for a capacitive screen, and having a writing tip and/or a pad that is/are retractable by turning a first barrel relative to a second barrel of said writing instrument.

BACKGROUND

A writing instrument is known having a retractable tip including a pad for a capacitive screen. However, when the writing tip and/or the pad is/are retractable by turning a first barrel relative to a second barrel of said writing instrument, it is not possible to use the pad by holding the writing instrument by the barrel that is not equipped with a pad, since the pad does not operate correctly. This raises considerable ergonomic problems for the user. There therefore exists a need in this sense.

SUMMARY

An embodiment provides a writing instrument presenting an axial direction, a circumferential direction, and a radial direction, said writing instrument comprising a first barrel and a second barrel that are able to rotate relative to each other about the axial direction, and presenting a first distal end and a second distal end opposite the first distal end in the axial direction, a writing tip being arranged at a side of the first distal end while a pad for a capacitive screen is arranged at a side of the second distal end, the writing tip and/or the pad for a capacitive screen being retractable (naturally, inside the writing instrument) by causing the first barrel to rotate relative to the second barrel, wherein a barrel among the first barrel and the second barrel, and referred to as the contacting barrel, includes a tongue extending in the circumferential direction, said tongue being configured to establish electrical contact with the other barrel among the first barrel and the second barrel, and referred to as the contacted barrel, whatever the relative position of the first barrel with respect to the second barrel.

In general, the axial direction corresponds to the direction of the axis of the barrels, and the radial direction is a direction perpendicular to the axial direction. The circumferential direction corresponds to the direction describing a ring around the axial direction. The axial, radial, and circumferential (or azimuth) directions correspond respectively to the direction defined by the height, the radius, and the angle in a cylindrical coordinate system. Finally, unless specified to the contrary, the adjectives "inner" and "outer" are used with reference to a radial direction such that the inner portion (i.e. a radially inner portion) of an element is closer to the axis than is an outer portion (i.e. a radially outer portion) of the same element.

Below, and unless specified to the contrary, the term "conductive" should be understood as "capable of conducting electricity". Conversely, below, and unless specified to the contrary, the term "insulating" should be understood as "insulating relative to electricity".

It can be understood that the pad is a termination configured to interact with a capacitive screen. The pad is conductive (because of the material from which it is made, or because of a coating). The shape, the compliance/stiffness, and the material(s) of a pad are not limited, providing the pad is capable of interacting with a capacitive screen, i.e. providing the screen can detect it making contact therewith.

It should also be understood that the type of writing tip is not limited. For example, the writing tip is a ballpoint tip, a felt tip, a mechanical pencil tip, a drypoint tip, etc.

It should also be understood that only the writing tip is retractable when the first barrel is caused to rotate relative to the second barrel, or only the pad is retractable when the first barrel is caused to rotate relative to the second barrel, or else the writing tip and the pad are both retractable or at least one of the two is retractable when the first barrel is caused to rotate relative to the second barrel. In other words, the writing instrument includes an internal mechanism that enables only the writing tip, only the pad, or the writing tip and the pad (simultaneously or sequentially) to be retracted and/or extended, when the first barrel is caused to rotate relative to the second barrel (and vice versa). By way of example, the internal mechanism comprises a device having helical cams, a screw-and-nut system, etc. Naturally, when the writing tip and the pad are both retractable, one of them may be retractable by means of a mechanism that does not use relative turning between the two barrels, such as for example a ratchet mechanism.

"Whatever the relative position of the first barrel with respect to the second barrel", refers to the relative position of the barrels in order to cause the writing tip and/or the pad to be retracted and/or extended from the first or the second distal end, as applicable. Naturally, when the first barrel and/or the second barrel is/are not mounted on the writing instrument, there is no electrical contact between the two barrels. However, when both barrels are mounted on the writing instrument, then, by means of the tongue, the two barrels are in electrical contact.

Naturally, the contacting barrel is the barrel among the first barrel and the second barrel fitted with the tongue while the contacted barrel is the barrel among the first barrel and the second barrel that is not fitted with the tongue. It should be understood that the tongue may be integrated with the contacting barrel, or it may form a part that is distinct from the contacting barrel and that is mounted on the contacting barrel by any means known to the person skilled in the art.

The tongue extends in the circumferential direction and it is suitable for co-operating with the contacted barrel by being subjected to some minimum amount of mechanical stress when the barrels are rotated relative to each other in order to retract and/or extend the writing tip and/or the pad. Indeed, when one barrel turns relative to the other, the load to which the tongue is subjected is mainly oriented in the circumferential direction. Thus, the direction of the main mechanical stresses is parallel to the direction of the tongue, which makes it possible to ensure good strength for said tongue. In addition, this configuration makes it possible to ensure contact whatever the relative position of the barrels. Thus, by means of the tongue, electrical contact between the two barrels can be ensured whatever their relative position. Naturally, it should be understood that the first barrel, the second barrel, and the tongue are conductive, e.g. by means of their constituent material(s) or by means of a coating. The user may therefore handle the writing instrument by holding it by either barrel in order to use the pad. Such a writing instrument is particularly easy to use, and is more ergonomic in use than prior art writing instruments.

In some embodiments, the tongue is a flexible tongue. In the meaning of the invention, a "flexible" tongue is easier to deform in bending than the barrels. In other words, the stiffness of the tongue in bending is at least two times less than the stiffness in radial deformation of the barrels (i.e. the compliance of the tongue is at least two times greater than the ones of the barrels). In a variant, the stiffness of the tongue in bending is at least five times, or even ten times, less than the stiffness in radial deformation of the barrels (i.e. the compliance of the tongue is at least five times, or even ten times, greater than the one of the barrels).

By means of the elasticity of the tongue, permanent contact with the contacted barrel can be ensured easily.

In some embodiments, at least one portion of the tongue co-operates by bearing with the contacted barrel, whatever the relative position of the first barrel with respect to the second barrel.

Such bearing makes it possible to ensure permanent mechanical contact between the tongue and the contacted barrel, whereby permanent electrical contact is also ensured between these two elements. By way of example, this bearing may result in permanent elastic deformation of the tongue when the barrels are assembled together in the writing instrument.

In some embodiments, the contacting barrel presents an engagement portion engaged inside the contacted barrel, the engagement portion comprising said tongue.

The tongue is thus arranged inside the contacted barrel. This makes it possible to ensure good protection of the tongue against dirt and external aggression, whereby better quality and reliability of the electrical contact between the tongue and the contacted barrel are ensured. This also presents the advantage of masking the tongue inside the writing instrument, whereby the appearance and the ease of use of the writing instrument are preserved.

In some embodiments, the tongue extends in an opening extending in a circumferential direction, from an edge of said opening.

It should be understood that the opening presents an edge, the tongue being connected to the contacting barrel by a portion of the edge of said opening. Thus, the tongue is arranged in an opening. This gives a certain amount of protection to the tongue, whereby deterioration is avoided, in particular during initial assembly of the writing instrument and during relative turning of the barrels. Reliability of the electrical contact is thus improved.

In some embodiments, the tongue is in the form of a portion of a ring presenting a first circumferential end and a second circumferential end opposite from the first circumferential end, the first circumferential end being connected to the contacting barrel while a portion of the second circumferential end is configured to establish electrical contact with the contacted barrel.

In general, the term "end portion" refers to the portion that extends from said end of the tongue over maximum 50% of the circumferential length of the tongue.

It should be understood that the second circumferential end portion co-operates completely or in part, e.g. via the second circumferential end, but not necessarily, with the contacted barrel in such a manner as to establish electrical contact. Such a tongue is particularly easy to manufacture, e.g. when manufacturing of the contacting barrel integrally with the tongue by molding. In addition, such a tongue presents a structure that is simple and reliable, giving the electrical contact a degree of reliability over time.

In some embodiments, the tongue and the contacting barrel form a single part. This facilitates both manufacturing of the assembly and also assembling the writing instrument. This also makes it possible to ensure good electrical connection between the contacting barrel and the tongue.

In some embodiments, the tongue presents a distal end portion, a projection extending radially from said distal end portion.

The term "distal end portion" refers to the portion that extends from the distal end of the tongue over maximum 50% of the circumferential length of the tongue. It should be understood that the contact between the tongue and the contacted barrel is made in particular by this radial projection. Such a projection makes it possible to ensure a bearing in the radial direction between the tongue and the contacted barrel whatever the relative position of the two barrels. Such a projection is simple to implement and makes it possible to obtain electrical contact that is effective and reliable.

In some embodiments, the tongue is formed by an iso-stress beam.

An iso-stress beam is a beam in which the stresses are equal over the entire length of the beam when it is subjected to load. In particular, the cross-section of such a beam varies progressively along the entire length of said beam. This makes it possible to avoid any concentration of stress in any one portion of the beam so as to improve in particular its resistance to creep. The reliability of electrical contact between the tongue and the contacted barrel is thus improved. By way of example, the beam presents a cross-section that decreases going from its proximal end to its distal end. By way of example, the section of the beam is rectangular, which facilitates manufacturing to some extent, but naturally, the shape of the section is not limiting.

In some embodiments, the first barrel and the second barrel are assembled together by means of a snap-fastening ring.

It should be understood that the snap-fastening ring forms an intermediate part in the assembly of the first and second barrels. It should further be understood that the snap-fastening ring is assembled to each of the barrels by respective snap-fastening. Snap-fastening involves assembling two parts together by engagement and elastic deformation (generally local deformation of only a portion of a part, e.g. of a tongue, or of a peripheral element of said part, or by overall deformation of the parts involved in the assembly). Once the two parts are engaged in the snap-fastening position, they have generally returned to their initial shape and no longer present elastic deformation (or they present a reduced amount of elastic deformation). When the two portions are engaged with each other in the snap-fastening position, they co-operate with each other in such a manner as to oppose, or even block, relative movements of said portions in the release direction (the direction opposite the engagement direction). In the snap-fastening position, the two portions may further co-operate so as to oppose, or even block, their relative movements in the direction for extending their engagement, beyond the snap-fastening position. Assembly by snap-fastening presents the advantage of being easy to implement and reliable. In a variant, snap-fastening between the ring and the barrels is irreversible (e.g. by means of a self-blocking structure or adequate stiffness of the portions), whereby the writing instrument cannot be taken apart (i.e. cannot be taken apart without destroying it), which further improves its reliability.

In some embodiments, the engagement portion comprises a support portion supporting the snap-fastening ring, the tongue being arranged in a portion that is distinct from said support portion.

Thus, distinct functions (assembly on one side, electrical contact on the other side) are performed by different parts, whereby each function is made reliable, in particular the electrical contact between the tongue and the contacted barrel.

In some embodiments, the contacted barrel presents an annular contact surface configured to co-operate with at least one portion of the tongue.

It should be understood that the tongue co-operates completely or in part with the annular contact surface. In particular, the tongue co-operates by sliding contact, or even by sliding bearing, with the contact surface. In this way, it is ensured that the tongue is always in contact with the contacted barrel, via the contact surface, whatever the relative position of the barrels, in particular whatever their relative position in the circumferential direction.

In some embodiments, the first barrel and the second barrel are made of an electrically-conductive polymer material.

By way of example, an electrically-conductive polymer material is a polymer material including, in its bulk, a filler comprising at least one electrically-conductive material.

By way of example, the polymer material is a thermoplastic. For example, the plastics material comprises one or more compounds selected from acrylonitrile butadiene styrene (also known under the acronym ABS), acrylonitrile methyl methacrylate (also known under the acronym AMMA), acrylonitrile styrene acrylate (also known under the acronym ASA), cellulose acetate (also known under the acronym CA), cellulose acetate butyrate (also known under the acronym CAB), cellulose acetate propionate (also known under the acronym CAP), expanded polystyrene (also known under the acronym EPS), ethylene tetrafluoroethylene (also known under the acronym ETFE), ethylene vinyl alcohol (also known under the acronym EVAL or EVOH), perfluoro ethylene propylene (also known under the acronym FEP or PFEP), methyl methacrylate butadiene styrene (also known under the acronym MBS), methyl cellulose (also known under the acronym MC), polyamide (also known under the acronym PA), polycaprolactam (also known under the acronym PA6), polyamide imide (also known under the acronym PAI), polyacrylonitrile (also known under the acronym PAN), polybutene-1 (also known under the acronym PB-1), polybutylene terephthalate or poly(butylene terephthalate) (also known under the acronym PBT), polycarbonate (also known under the acronym PC), polytrichloroethylene (also known under the acronym PCTFE), polyethylene (also known under the acronym PE), high-density polyethylene (also known under the acronym HD-PE), low-density polyethylene (also known under the acronym LD-PE), linear low-density polyethylene (also known under the acronym LLD-PE), ultra high molecular weight polyethylene (also known under the acronym UHMW-PE), polyether block amide (also known under the acronym PEBA), polyestercarbonate (also known under the acronym PEC), polyetheretherketone (also known under the acronym PEEK), polyetherimide (also known under the acronym PEI), polyetherketone (also known under the acronym PEK), poly(ethylene naphthalate) (also known under the acronym PEN), polyethersulfone (also known under the acronym PESU), poly(ethylene terephthalate) (also known under the acronym PET), perfluoroalkoxy (also known under the acronym PFA), polyketone (also known under the acronym PK), polymethyl methacrylate (also known under the acronym PMMA), polymethylpentene (also known under the acronym PMP), polyoxymethylene or polyacetal or polyformaldehyde (also known under the acronym POM), polypropylene or polypropene (also known under the acronym PP), poly(phenylene ether) (also known under the acronym PPE), poly(phenylene oxide) (also known under the acronym PPO), poly(propylene oxide) (also known under the acronym PPDX), poly(phenylene sulfide) (also known under the acronym PPS), polystyrene (also known under the acronym PS), polysulfone (also known under the acronym PSU), polytetrafluoroethylene (also known under the acronym PTFE), polyurethane (also known under the acronym PUR), poly(vinyl acetate) (also known under the acronym PVAC), poly(vinyl alcohol) (also known under the acronym PVAL), polyvinyl chloride (also known under the acronym PVC), polyvinylidene fluoride (also known under the acronym PVDF), poly(vinyl fluoride) (also known under the acronym PVF), styrene acrylonitrile (also known under the acronym SAN), silicone (also known under the acronym SI), styrene maleic anhydride (also known under the acronym SSMA or SMAnh), polyolefin, polyester. More generally, and by way of example, the polymer material is a synthetic organic polymer material or a synthetic organic polymer.

A filler is an additive material introduced into the polymer material during fabrication of the barrels. Thus, a polymer material filled with at least one conductive material is a polymer material into the bulk of which at least one conductive material is introduced. Because of this conductive material filler, the barrels present conductive properties. For example, the polymer material may be filled with at least 2% by weight of conductive material.

For example, the conductive material filler comprises one or more compounds selected from carbon black, carbon nanotubes, or metal particles. Such materials are particularly well adapted to fabricating the barrels on an industrial scale.

BRIEF DESCRIPTION OF THE DRAWINGS

The invention and its advantages can be better understood on reading the detailed description of various embodiments of the invention given as non-limiting examples. The description refers to the accompanying sheets of figures, in which.

DETAILED DESCRIPTION

An embodiment of a writing instrument of the invention is described with reference to FIGS. 1A to 5.

Figure 1A:
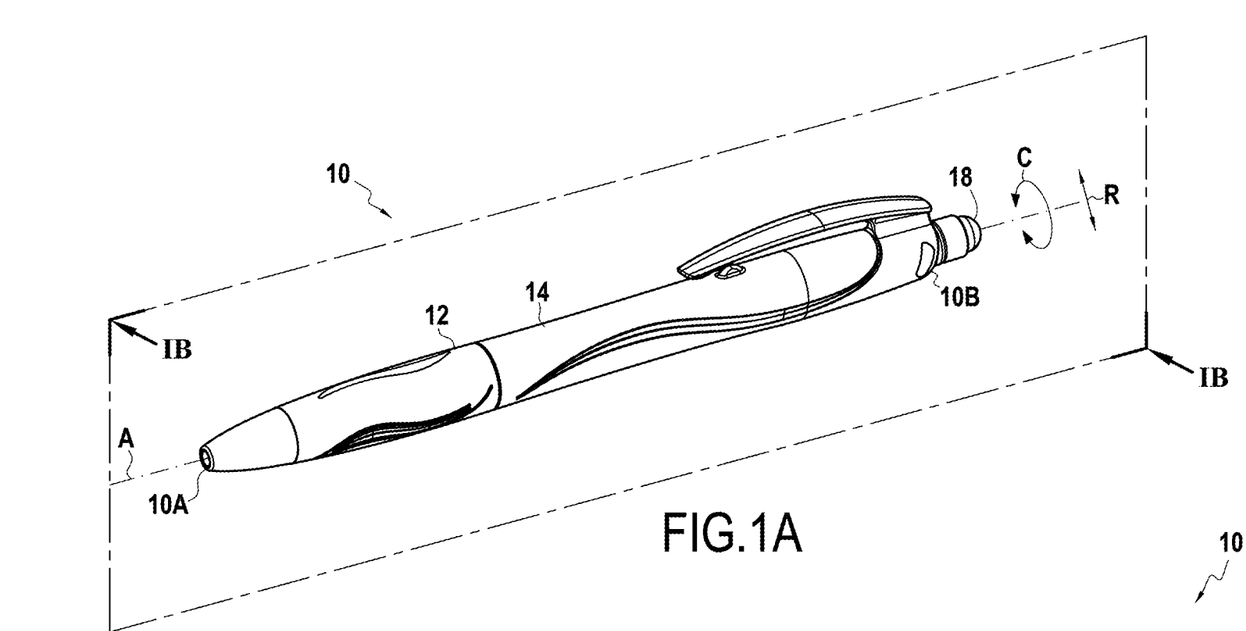
FIG. 1A shows a writing instrument seen in perspective.
Figure 1B:
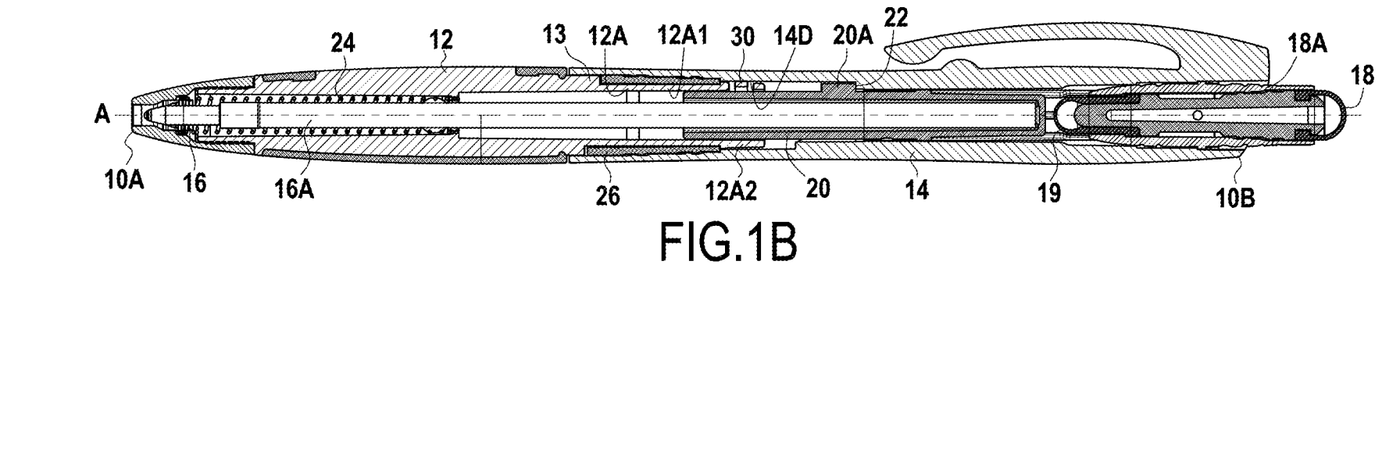
FIG. 1B shows the writing instrument of FIG. 1A seen in section on plane IB of FIG. 1A.

FIGS. 1A and 1B show a writing instrument 10 presenting an axial direction A, a radial direction R, and a circumferential direction C. The writing instrument 10 includes a first barrel 12 and a second barrel 14. The barrels 12 and 14 are able to rotate about the direction A (i.e. they can move in the direction C) relative to each other. The writing instrument 10 presents a first distal end 10A and a second distal end 10B, opposite from the first distal end 10A in the axial direction A. The first distal end 10A of the writing instrument is formed by the distal end of the first barrel 12, while the second distal end 10B of the writing instrument 10 is formed by the distal end of the second barrel 14.

A writing tip 16 is arranged is arranged at the first distal end 10A, the tip 16 being retractable in this example, while a pad 18 for a capacitive screen is arranged at the second distal end 10B. The writing tip 16 is retractable by causing the first barrel 12 to rotate relative to the second barrel 14, or vice versa, by means of a mechanism described below. In this example, the pad 18 is removable from the second barrel 14 and is mounted on a bushing 18A carrying another pad 19 on its end opposite from the pad 18 in the axial direction A. As a function of requirements, the user may thus choose to use either the pad 18 or the pad 19 by reversing the mounting of the bushing 18A in the second barrel 14. This bushing 18A is snap-fastened with the second barrel 14. Naturally, the bushing 18A is configured in such a manner that, when it is mounted in the second barrel 14, there is permanent electrical contact between the pads 18 and 19 and the second barrel 14.

In a variant, the pad 18 is mounted in fixed manner (i.e. is neither removable nor retractable) on the second barrel 14, while the writing tip 16 is retractable. In yet another variant, the pad 18 is retractable in the second barrel 14, while the writing tip 16 may optionally be retractable. When the pad 18 is retractable but the writing tip 16 is not, the pad is retractable by causing the first barrel 12 to turn relative to the second barrel 14, e.g. by means of an internal mechanism similar to that described below for the writing tip 16.

In this example, the writing tip 16 is retractable by means of a helical cam mechanism. This mechanism comprises a carriage 20 that is movable in translation in the axial direction A, a radial projection 20A of the carriage 20 co-operating with a helical cam 22 formed on the inside surface of the second barrel 14 (see FIG. 3). In addition, the carriage 20 is blocked in rotation relative to the first barrel 12, in this example by means of an axial groove 20B engaged with a corresponding spline (not shown) arranged on the inside surface of the first barrel 12. Thus, when the first barrel 12 is caused to turn relative to the second barrel (naturally about the axial direction A), co-operation between the stud 20A with the cam 22 together with the carriage 20 being blocked in rotation relative to the first barrel 12 make it possible to move said carriage 20 in translation in the axial direction A inside the writing instrument 10. With the carriage 20 carrying the ink reservoir 16A on which the writing point 16 is mounted, the movement of the carriage 20 makes it possible to extend and retract the writing tip 16 from/into the first barrel 12 via the first end 10A. A spring 24 assists retraction of the tip 16 into the first barrel 12 and ensures permanent contact between the projection 20A and the cam 22 via the reservoir 16A.

Figures 2A, 2B:
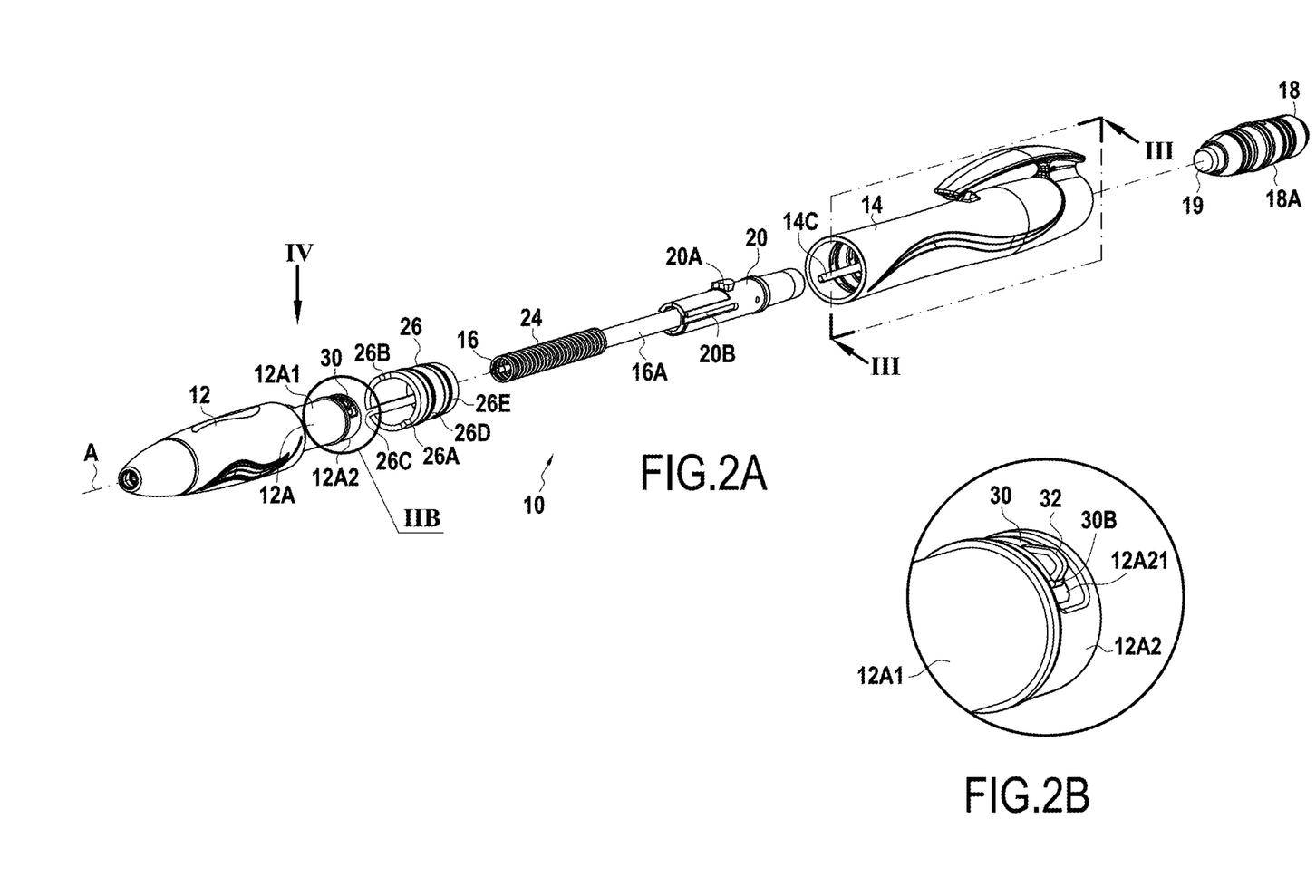
FIG. 2A shows the writing instrument of FIG. 1A seen in exploded perspective view.
FIG. 2B shows a detail of the magnified portion IIB in FIG. 2A.
Figure 3:
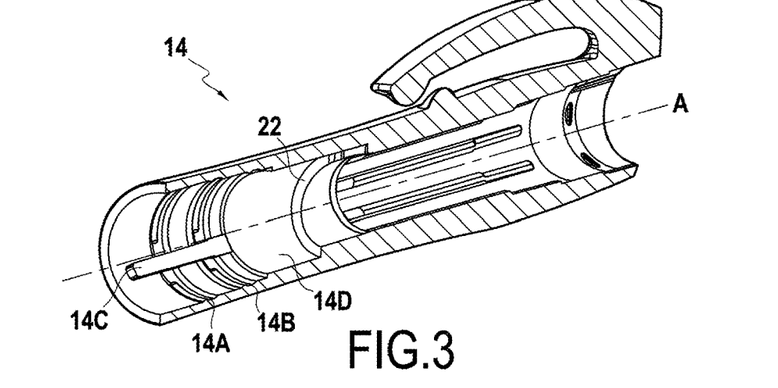
FIG. 3 is a section view of the second barrel on plane III of FIG. 2.
Figure 4A:
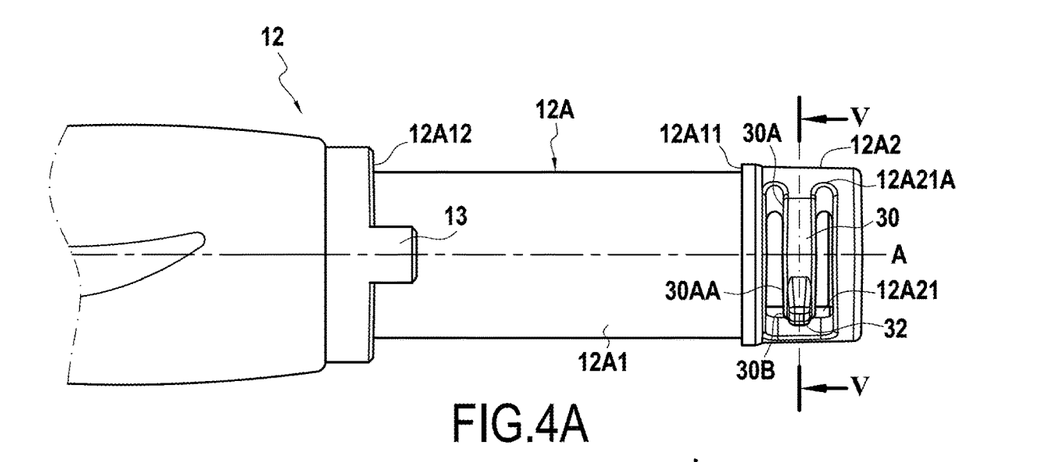
FIG. 4A is a section view along arrow IV of FIG. 2A.
Figure 4B:
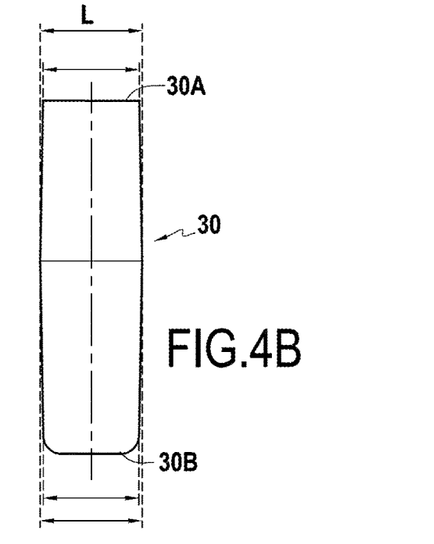
FIG. 4B is a detail view of the tongue of FIG. 4A.
Figure 5:
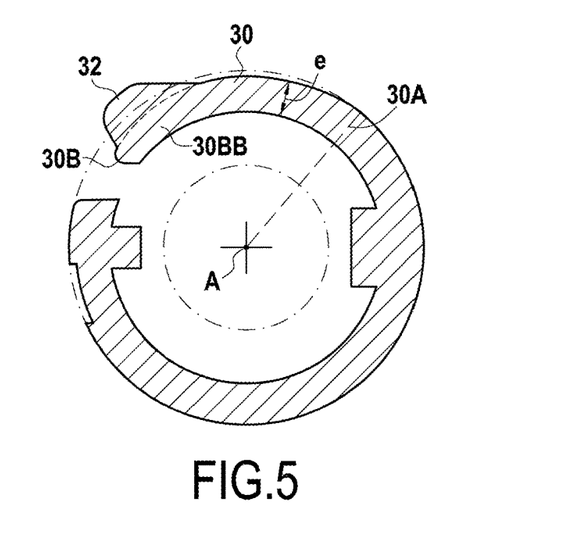
FIG. 5 is a section view on plane V of FIG. 4A.

Assembly of the first barrel 12 with the second barrel 14 is described below in greater detail. The first barrel 12 and the second barrel 14 are assembled together by means of a snap-fastening ring 26. More particularly, the first barrel 12 presents an engagement portion 12A engaged inside the second barrel 14, this engagement portion 12A comprising a support portion 12A1 supporting the snap-fastening ring 26. This support portion 12A1 forms a bearing for the snap-fastening ring 26, and presents a stud 13 co-operating in abutment with axially-extending shoulders 26A and 26B of the snap-fastening ring 26 in order to limit its circumferential stroke. The ring 26 is blocked in translation in the axial direction A over the support portion 12A1 by means of the annular shoulders 12A11 and 12A12 of the support portion 12A1. The ring 26 presents an axial slot 26C extending along the entire axial length of the ring 26, which enables the ring 26 to deform radially, whereby the ring 26 can be mounted easily on the support portion 12A1 by being engaged about the engagement portion 12A until it reaches the support portion 12A1. In addition, the ring 26 presents two annular splines 26D and 26E that co-operate by snap-fastening respectively with corresponding annular splines 14A and 14B arranged on the inside surface of the second barrel 14. In addition, an axial spline 14C arranged in the inside surface of the second barrel 14 is engaged in the slot 26C of the ring 26, whereby the ring 26 is coupled in rotation with the second barrel 14. Thus, the stud 13 of the first barrel 12 limits the stroke of relative movements in rotation of the first barrel 12 with respect to the second barrel 14 via the ring 26.

Naturally, this example of assembling the barrels is not limiting and it is possible to envisage the barrels being assembled in the writing instrument by any other type of assembly, providing the barrels are able to rotate relative to each other in such a manner as to cause the writing tip and/or the pad to retract and/or extend.

The first barrel 12 presents a tongue 30 extending in the circumferential direction, this tongue 30 being configured to establish electrical contact between the first barrel 12 and the second barrel 14. In this example, the first barrel 12 fitted with the tongue 30 forms a contacting barrel, while the second barrel 14 forms a contacted barrel.

More particularly, in this example, the tongue 30 is formed integrally with the first barrel 12. The tongue 30 is arranged in a distal portion 12A2 of the engagement portion 12A of the first barrel 12. The tongue 30 is therefore arranged in a distinct portion of the support portion 12A1. The distal portion 12A2 is engaged inside the second barrel 14.

The tongue 30 is arranged in an opening 12A21 extending in the circumferential direction C. The tongue 30 extends in the opening 12A21 from an edge 12A21A of said opening 12A21. The tongue 30 is generally in the form of a portion of a ring presenting a first circumferential end 30A and a second circumferential end 30B that is opposite from the first circumferential end 30A in the circumferential direction. The tongue 30 is connected to the first barrel 12 via the first circumferential end 30A, while the portion of the second circumferential end 30BB is configured to establish electrical contact with the second barrel 14. In other words, in this example, the second circumferential end 30B forms the distal end of the tongue 30 while the first circumferential end 30A forms the proximal end of the tongue 30. A projection 32 extends radially outwards from a distal end portion, or a second circumferential end portion 30BB of the tongue 30. In this example, it should be understood that the radius of the first barrel 12 at the projection 32 is greater than the inside radius of the corresponding portion of the second barrel 14, thereby ensuring that the tongue 30 co-operates by bearing with the second barrel 14 via the projection 32.

The tongue 30 is formed by an iso-stress beam. In this example, the iso-stress beam presents a radial thickness E that decreases over the entire circumferential length of the tongue 30 (see FIG. 5) from the proximal end 30B to the distal end 30A. In addition, the axial width L of the beam increases and then decreases over the entire circumferential length of the tongue 30 (see FIG. 4B), from the proximal end 30B to the distal end 30A. Such a shape presents the advantage of being particularly well adapted to methods of manufacturing by molding.

On its inside wall, the second barrel 14 presents an annular contact surface 14D that co-operates by sliding bearing with the projection 32 of the tongue 30. Thus, when the barrels are rotated relative to each other, the tongue 30 bears constantly against the annular surface 14D via the projection 32, thereby ensuring electrical contact between the two barrels, whatever their relative position. Since electrical continuity between the first barrel 12 and the second barrel 14 is ensured, the user can therefore handle the writing instrument 10 via the first barrel 12 only while using the pad 18.

Naturally, the first barrel 12, the tongue 30, and the second barrel 14 are made of a conductive material, in this example a conductive polymer material. In addition, the bushing 18A on which the pad 18 (and 19) is mounted is also made of a conductive material, in this example a conductive polymer material, whereby electrical continuity is ensured between the second barrel 14 and the pad 18 (and 19). It should be observed that since the bushing 18A is not designed to move relative to the second barrel 14, apart from putting the endpiece 19 in the position for use instead of the endpiece 18 and vice versa, the snap-fastening elements (not referenced) ensure contact that is sufficiently tight also to ensure electrical contact between the bushing 18A and the second barrel 14, and therefore between the pad 18 (and 19) and the second barrel 14. Since the first barrel 12 can be turned relative to the second barrel 14, the snap-fastening elements do not ensure contact that is sufficiently tight also to ensure electrical contact between these two barrels. That is why the contact tongue 30 is necessary for ensuring electrical contact between the first barrel 12 and the second barrel 14, but such a tongue is not necessary for ensuring electrical contact between the second barrel 14 and the bushing 18A. In addition, because of the tongue 30, there is no need for the locking ring to be made of a conductive material. Thus, by way of example, the bushing is made of a non-conductive polymer material presenting good resistance to wear (i.e. presenting a hardness greater than the hardness of the barrels) and a low coefficient of friction with the barrels (i.e. a coefficient of friction that is less than the coefficient of friction of the barrels).

Although the present invention is described with reference to specific embodiments, it is clear that modifications and changes may be made to these embodiments without going beyond the general scope of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A writing instrument presenting an axial direction, a circumferential direction, and a radial direction, the writing instrument comprising a first barrel and a second barrel that are able to rotate relative to each other about the axial direction, and presenting a first distal end and a second distal end opposite the first distal end in the axial direction, a writing tip being arranged at a side of the first distal end while a pad for a capacitive screen is arranged at a side of the second distal end, the writing tip and the pad for a capacitive screen being retractable with respect to the first distal end and the second distal end, respectively, by causing the first barrel to rotate relative to the second barrel, wherein one of the first barrel and the second barrel is referred to as the contacting barrel and includes a tongue extending in the circumferential direction, an opening extends in the circumferential direction with the tongue extending in the opening from an edge of the opening and being configured to establish electrical contact with the other barrel among the first barrel and the second barrel, and referred to as the contacted barrel, whatever the relative position of the first barrel with respect to the second barrel.

2. A writing instrument according to claim 1, wherein at least one portion of the tongue co-operates by bearing with the contacted barrel, whatever the relative position of the first barrel with respect to the second barrel.

3. A writing instrument according to claim 1, wherein the contacting barrel presents an engagement portion engaged inside the contacted barrel, the engagement portion comprising the tongue.

4. A writing instrument according to claim 1, wherein the tongue is in the form of a portion of a ring presenting a first circumferential end and a second circumferential end opposite from the first circumferential end, the first circumferential end being connected to the contacting barrel while a portion of the second circumferential end is configured to establish electrical contact with the contacted barrel.

5. A writing instrument according to claim 1, wherein the tongue is formed by an iso-stress beam.

6. A writing instrument according to claim 1, wherein the first barrel and the second barrel are assembled together by a snap-fastening ring.

7. A writing instrument according to claim 1, wherein the contacting barrel presents an engagement portion engaged inside the contacted barrel, the engagement portion comprising the tongue, the first barrel and the second barrel are assembled together by a snap-fastening ring, and wherein the engagement portion comprises a support portion supporting the snap-fastening ring, the tongue being arranged in a portion that is distinct from the support portion.

8. A writing instrument according to claim 1, wherein the contacted barrel presents an annular contact surface configured to co-operate with at least one portion of the tongue.

9. A writing instrument according to claim 1, wherein the first barrel and the second barrel are made of an electrically-conductive polymer material.

10. A writing instrument presenting an axial direction, a circumferential direction, and a radial direction, the writing instrument comprising a first barrel and a second barrel that are able to rotate relative to each other about the axial direction, and presenting a first distal end and a second distal end opposite the first distal end in the axial direction, a writing tip being arranged at a side of the first distal end while a pad for a capacitive screen is arranged at a side of the second distal end, the writing tip and/or the pad for a capacitive screen being retractable by causing the first barrel to rotate relative to the second barrel, wherein a barrel among the first barrel and the second barrel, and referred to as the contacting barrel, includes a tongue extending in the circumferential direction, the tongue being configured to establish electrical contact with the other barrel among the first barrel and the second barrel, and referred to as the contacted barrel, whatever the relative position of the first barrel with respect to the second barrel, the tongue being in the form of a portion of a ring presenting a first circumferential end and a second circumferential end opposite from the first circumferential end, the first circumferential end being connected to the contacting barrel while a portion of the second circumferential end is configured to establish electrical contact with the contacted barrel.

11. A writing instrument presenting an axial direction, a circumferential direction, and a radial direction, the writing instrument comprising a first barrel and a second barrel that are able to rotate relative to each other about the axial direction, and presenting a first distal end and a second distal end opposite the first distal end in the axial direction, a writing tip being arranged at a side of the first distal end while a pad for a capacitive screen is arranged at a side of the second distal end, the writing tip and/or the pad for a capacitive screen being retractable by causing the first barrel to rotate relative to the second barrel, wherein a barrel among the first barrel and the second barrel, and referred to as the contacting barrel, includes a tongue extending in the circumferential direction, the tongue being configured to establish electrical contact with the other barrel among the first barrel and the second barrel, and referred to as the contacted barrel, whatever the relative position of the first barrel with respect to the second barrel, the contacting barrel presents an engagement portion engaged inside the contacted barrel, the engagement portion comprising the tongue, the first barrel and the second barrel are assembled together by a snap-fastening ring, and wherein the engagement portion comprises a support portion supporting the snap-fastening ring, the tongue being arranged in a portion that is distinct from the support portion.

12. A writing instrument presenting an axial direction, a circumferential direction, and a radial direction, the writing instrument comprising a first barrel and a second barrel that can rotate relative to each other about the axial direction and each has a first distal end and a second distal end opposite the first distal end in the axial direction, a writing tip being arranged at a side of the first distal end and a pad for a capacitive screen being arranged at a side of the second distal end, the writing tip and the pad being retractable with respect to the first distal end and the second distal end, respectively, by causing the first barrel to rotate relative to the second barrel, wherein one of the first barrel and the second barrel is referred to as the contacting barrel and includes a tongue extending in the circumferential direction, the tongue including a distal end portion having a projection extending radially therefrom and being configured to establish electrical contact with the other barrel of the first barrel and the second barrel that is referred to as the contacted barrel, whatever the relative position of the first barrel is with respect to the second barrel.

\* \* \* \* \*